United States Patent [19]
Desir, Sr.

[11] Patent Number: 5,603,546
[45] Date of Patent: Feb. 18, 1997

[54] FLUSH GLASS WINDOW MOLDING

[75] Inventor: Julio Desir, Sr., Redford, Mich.

[73] Assignee: The Standard Products Company, Cleveland, Ohio

[21] Appl. No.: 598,643

[22] Filed: Feb. 6, 1996

[51] Int. Cl.$^6$ .................................................... B60J 10/02
[52] U.S. Cl. .................... 296/93; 296/146.15; 296/201; 52/204.591; 52/208
[58] Field of Search ................................ 296/93, 146.15, 296/201; 52/204.591, 204.69, 208

[56] References Cited

U.S. PATENT DOCUMENTS

| | | | |
|---|---|---|---|
| 2,449,875 | 9/1948 | Cadwallader | 296/84 |
| 2,736,404 | 2/1956 | Clingman | 189/78 |
| 4,571,278 | 2/1986 | Kunert | 156/108 |
| 4,765,673 | 8/1988 | Frabotta et al. | 296/93 |
| 5,001,876 | 3/1991 | Harper et al. | 52/208 |
| 5,009,462 | 4/1991 | Katcherin | 52/208 |
| 5,154,471 | 10/1992 | Mimura et al. | 296/93 |
| 5,154,952 | 10/1992 | Nozaki | 428/31 |
| 5,248,179 | 9/1993 | Biermacher et al. | 52/204.597 |
| 5,456,049 | 10/1995 | Goto et al. | 52/208 |

FOREIGN PATENT DOCUMENTS

| | | | |
|---|---|---|---|
| 3305257 | 8/1984 | Germany | 296/146.15 |
| 3604364 | 8/1986 | Germany | 296/146.15 |

Primary Examiner—William A. Cuchlinski, Jr.
Assistant Examiner—Christina Annick
Attorney, Agent, or Firm—Harness, Dickey & Pierce, P.L.C.

[57] ABSTRACT

A flush glass window molding for an automotive vehicle has a hollow triangular shaped portion for filling the gap created between an edge of a window panel and the vehicle body panel, a flexible finger located adjacent to a body-side leg of the triangular shaped portion and extending from the apex thereof, and a substantially flat base extending outward at a generally right angle from the apex of the window-side triangular leg. Furthermore, an outside surface of the window molding base is affixed to the inside of the window panel by a pressure sensitive adhesive tape and an inside surface of the base is affixed to a flange of the vehicle body panel by a urethane adhesive bead.

4 Claims, 3 Drawing Sheets

FLUSH GLASS WINDOW MOLDING

BACKGROUND OF THE INVENTION

This invention relates generally to flush glass window moldings for automotive vehicles and specifically to flush glass window moldings having a triangular shaped gap filling portion, a flexible finger adjacent thereto and a base portion extending inward therefrom.

Windshields, backlites and side windows are commonly mounted onto an automotive vehicle in a manner which leaves a gap between the periphery of the window panel and the adjacent vehicle body panel. This gap is often caused by part tolerance differences or vehicle build variations, however, the gap is covered by a window molding or lace. In covering the gap between the window panel and the body panels, the window molding serves to improve the visual appearance of the automotive vehicle and to reduce wind noise. To present the best aesthetic appearance, window moldings must extend evenly around the gap between the window panel and the body panels while being able to accommodate gaps of various widths. Moreover, these moldings should also be able to curve around the radii of the window panel without gapping or twisting.

It has been found that wind noise can be further reduced by use of a flush glass window molding. Traditionally, such flush glass window moldings have been of generally C-shaped configuration with a pliable tail attached to cover gap variations. The C-shaped section covers a portion of the inside surface, the edge, and a portion of the outside surface of the window panel. Although this method provides full encapsulation of the edge of the window panel, these moldings are often difficult to install and they visually obscure a portion of the outside surface of the window panel. Also, in many traditional flush glass window molding applications, the adhesive tends to release in high temperatures. Two examples of this C-shaped design can be seen in U.S. Pat. No. 5,001,876 entitled "Flush Glass Windshield Reveal Molding," issued to Harper and Desir on Mar. 26, 1991; and, U.S. Pat. No. 4,765,673 entitled "Windshield Reveal Molding," issued to Frabotta and Lang on Aug. 23, 1988, both of which are incorporated by reference herewithin. Another flush glass window molding design can be seen in U.S. Pat. No. 4,571,278 entitled "Glue Mounting of a Glass in a Bay," issued to Kunert on Feb. 18, 1986, incorporated by reference herewithin.

SUMMARY OF THE INVENTION

In accordance with the present invention, the preferred embodiment of a window molding has a hollow triangular shaped portion for filling the gap created between an edge of a window panel and an automotive vehicle body panel, a flexible finger located adjacent to a body-side leg of the triangular shaped portion and extending from the apex thereof, and a substantially flat base extending inward at a generally right angle from the apex of the window-side triangular leg. The window molding aesthetically fills the varying gap between the window panel and the vehicle body panel and also appears flush with the outside surface of the window panel and the vehicle body panel. Furthermore, an outside surface of the window molding base is affixed to the inside of the window panel by a pressure sensitive adhesive tape and an inside surface of the base is affixed to a flange of the vehicle body panel by a urethane adhesive bead. The window molding is adhered to the inside of the window panel by a method which minimizes problems caused by different expansion factors and the relaxation of traditional adhesives at high temperatures.

Additional advantages, and features of the present invention will become apparent from the following description and appended claims, taken in conjunction with the accompanying drawings.

DETAILED DESCRIPTION OF THE PREFERRED EMBODIMENT

Figure 1:
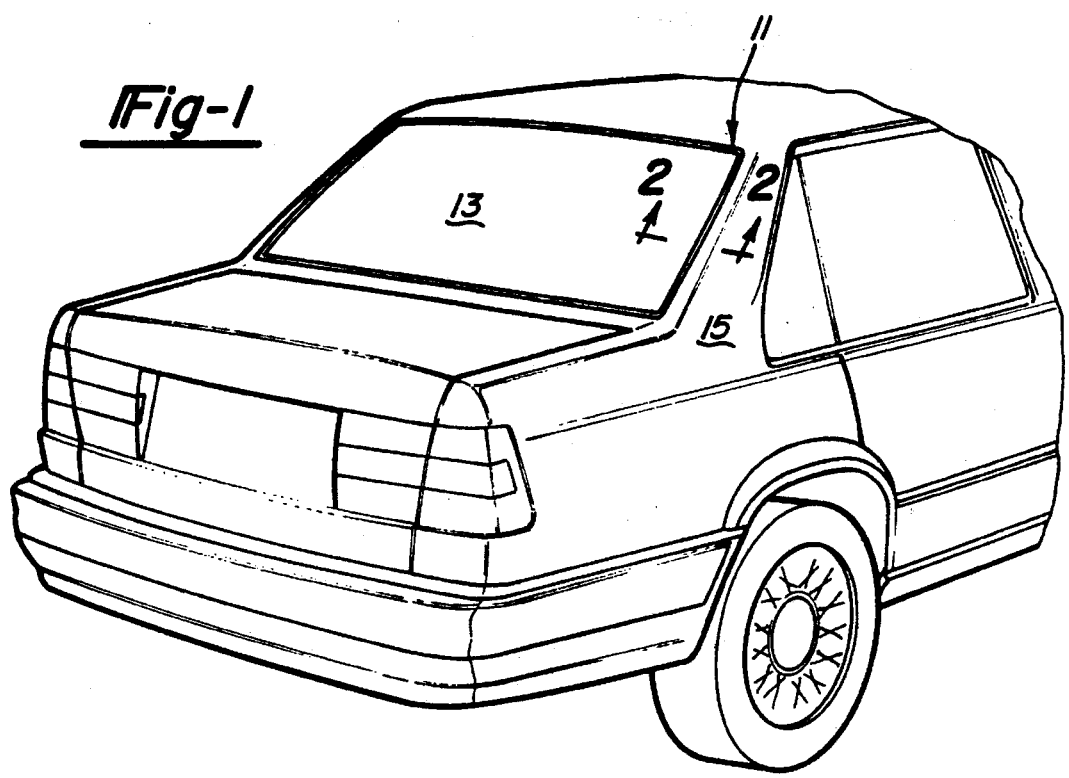
FIG. 1 is a perspective view of the rear of an automotive vehicle showing the relative position of the preferred embodiment of the present invention window molding.
Figure 2:
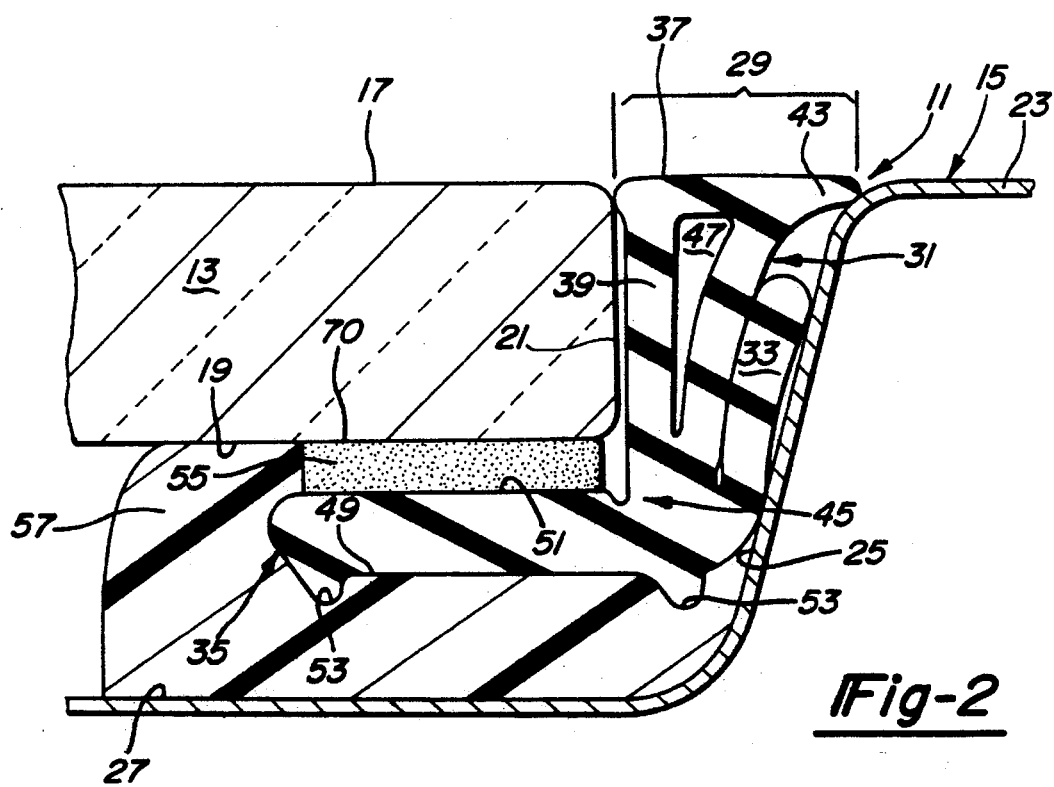
FIG. 2 is a sectional view of the present invention window molding in its installed position between the backlite and vehicle body panel, taken from FIG. 1 at line 2—2.

Referring to FIG. 1, the preferred embodiment of the flush glass window molding 11 of the present invention is shown in its installed position between a backlite 13 and an automotive vehicle body panel 15, such as a quarter panel. FIG. 2 depicts a typical sectional relationship in such an area. The backlite glass 13 has an outside surface 17 and an inside surface 19, both of which are peripherally bordered by an edge 21. In order to support backlite 13, vehicle body panel 15 has an appearance surface 23 with an offset portion 25 which is formed therefrom, ending with an inward turned flange 27. Flange 27 is substantially parallel to body panel appearance surface 23 and inside surface 19 of backlite 13. When backlite 13 is installed onto body panel flange 27, a gap is usually created between window edge 21 and body panel offset surface 25; this is usually due to part tolerance differences and build variations. Therefore, window molding 11 must fill gap 29.

Figure 3:
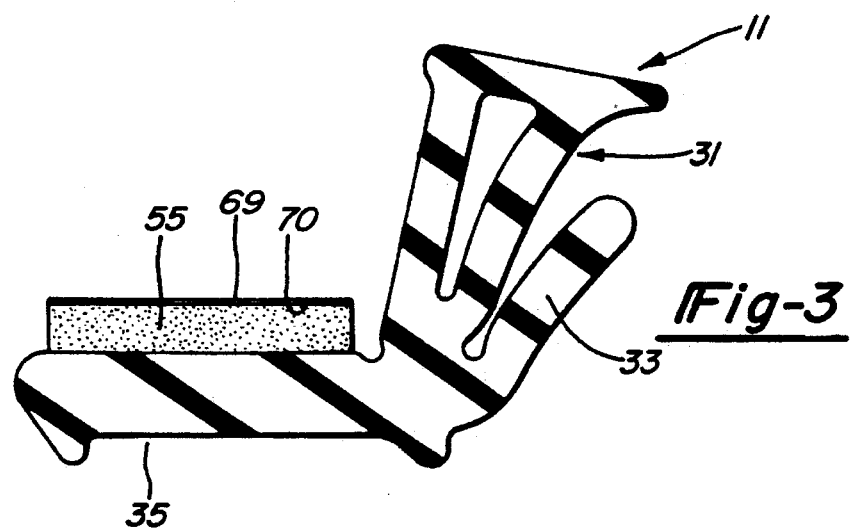
FIG. 3 is a sectional view of the present invention window molding in its free state, taken from FIG. 1 at line 2—2.

Window molding 11 is an extruded synthetic elastomeric part having an elongated shape. As can best be observed in FIGS. 2 and 3, window molding 11 has a typical cross sectional shape with a triangular shaped portion 31, a flexible finger 33 and a base 35. Triangular shaped portion 31 has a short visible triangular leg 37 which aesthetically fills gap 29 and is substantially flush with outside surface 17 of backlite 13 and appearance surface 23 of vehicle body panel 15. A generally straight window-side triangular leg 39 extends perpendicularly downward from visible triangular leg 37 and a curved body-side triangular leg 41 extends from a pointed end 43 of visible triangular leg 37 to an apex 45 of the triangular shape where body-side triangular leg 41 mates with window-side triangular leg 39. A triangularly shaped hollow 47 is thereby formed within triangular shaped portion 31 such that hollow 47 can be compressed when there is a tight build of backlite edge 21 to offset surface 25 of body panel 15.

Flexible finger 33 is a slightly curved member located adjacent to body-side triangular leg 41 of window molding 11 and joins with window molding 11 near apex 45 of triangular shaped portion 31. Flexible finger 33 is designed to provide a tight fit within gap 29. Base 35 extends inward at a substantially 45° angle (in the installed position) from apex 45 of window-side triangular leg 39. Base 35 has an inside surface 49 and an outside surface 51. A pair of lobes 53 protrude toward flange 27 and are proximate to each end of inside surface 49 of base 35. The synthetic rubber material used is an ethylene-propylene-diene terpolymer (EPDM) elastomer having a 70 shore A durometer.

In the preferred embodiment, outside surface 51 of base 35 is primed with a Chemlock 500 solvent so that a double faced acrylic pressure sensitive adhesive tape 55 will effectively adhere to outside surface 51. Chemlock 500 can be obtained from Lord Elastomer Products. This primer is applied on-line with a brush after the extrusion process. Furthermore a Corona discharge treatment is used to electrically etch the inside surface of base 35 so that a Beta seal 435.33 primer can be applied thereupon. This primer eliminates the need for application of a solvent and is intended to promote adhesion between window molding 11 and a urethane adhesive bead 57 which holds window molding 11 and backlite 13 onto flange 27. Beta seal 435.33 can be obtained from Essex Specialty Products, Inc., a subsidiary of Essex Chemical Corp., and the application of such is known to one skilled in the art. The adhesion process of the present invention is very advantageous over the methods previously used. Traditionally, a butyl or hot melt adhesive was used to affix a window molding to a backlite, however, at high temperatures this adhesive would often relax and the window molding would expand at a different rate from the backlite glass. Thus, due to the superior attachment system and cross-sectional design of the present invention, supplemental fasteners, butt joints and corner joints often used to hide the traditional imperfections are eliminated.

Figure 4:
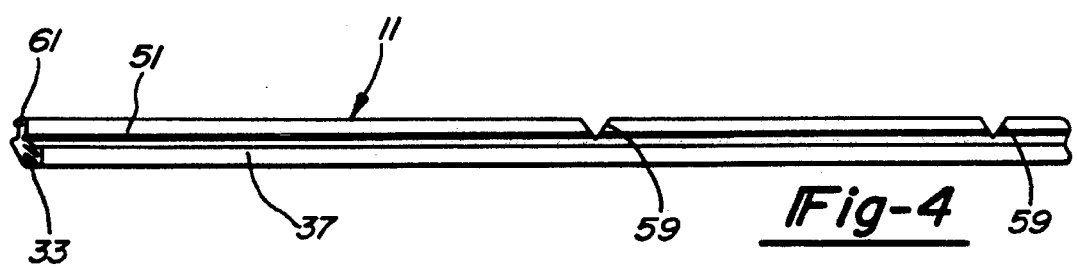
FIG. 4 is a rear elevation view of the present invention window molding in its free state, taken from FIG. 1.
Figure 5:
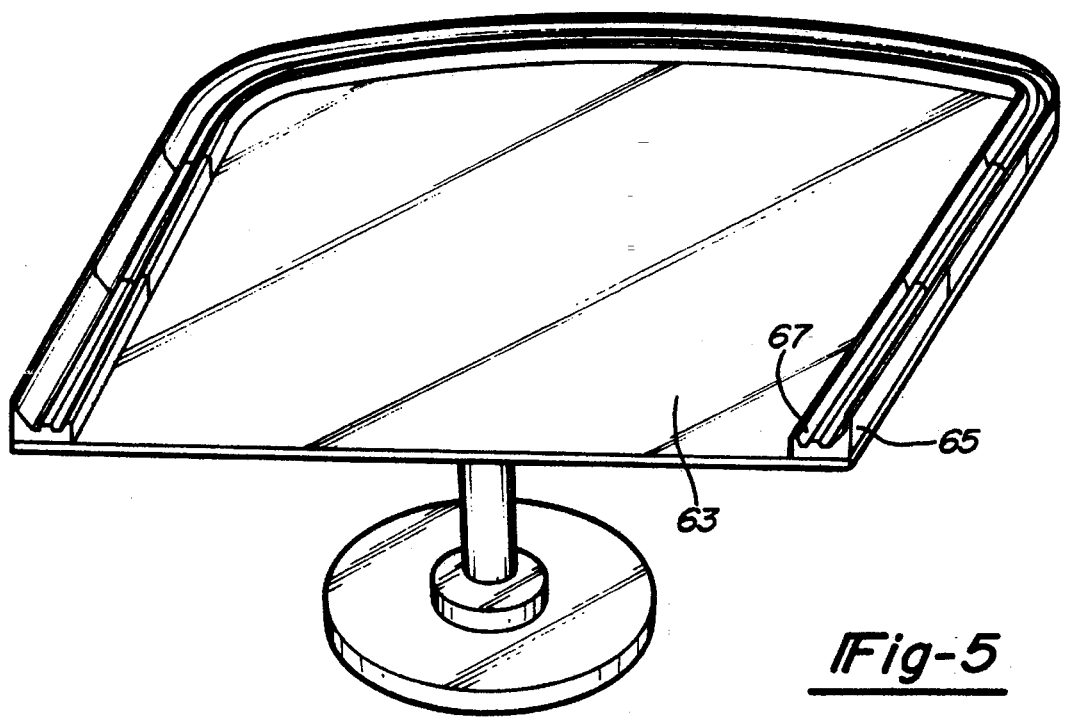
FIG. 5 is a perspective view of the assembly platform used for installing the present invention window molding of FIG. 4.
Figure 6:
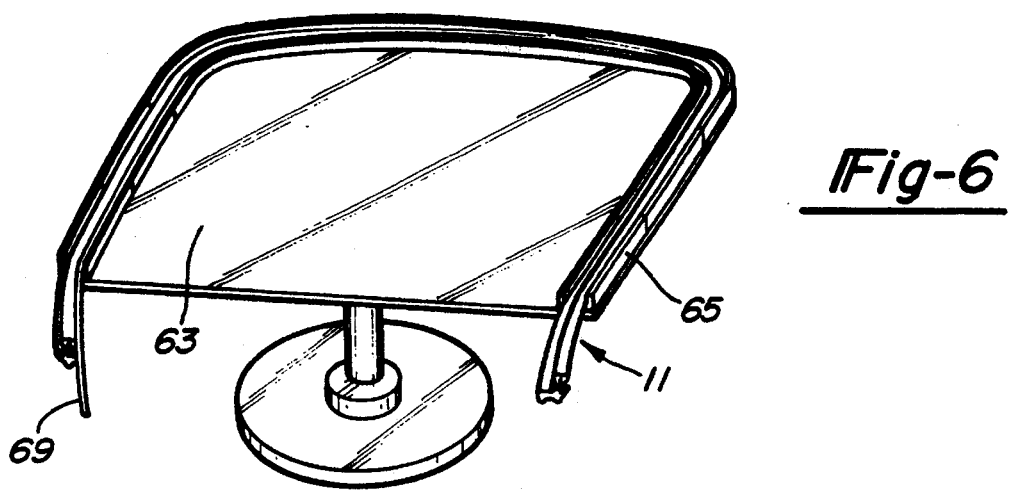
FIG. 6 is a perspective view of the assembly platform with the present invention window molding of FIG. 4 thereupon.
Figure 7:
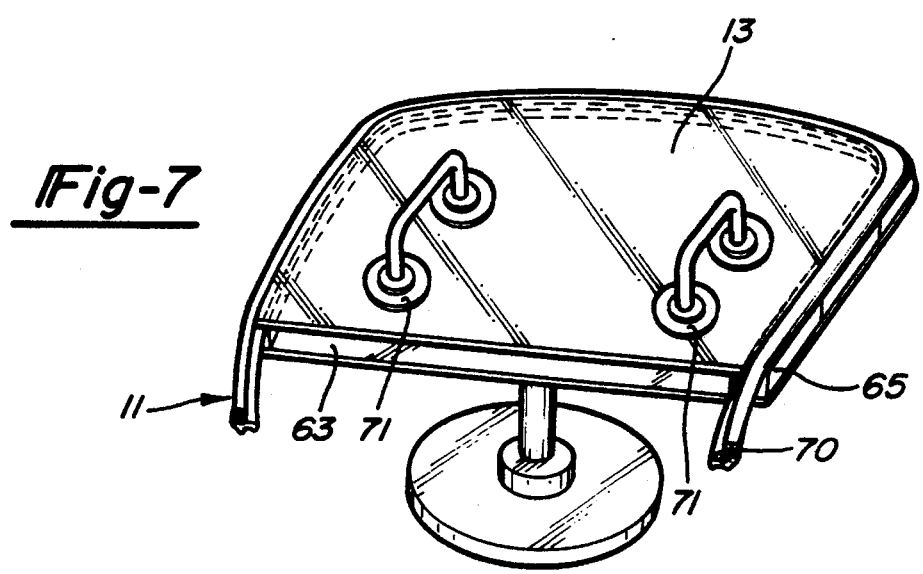
FIG. 7 is a perspective view of the assembly platform with the present invention window molding of FIG. 4 and the window panel located thereupon.
Figure 8:
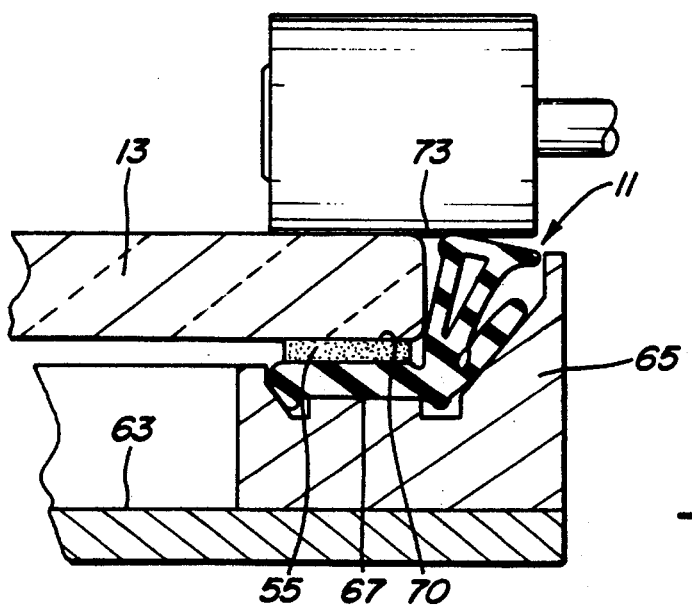
FIG. 8 is a section view of the assembly platform with the present invention window molding of FIG. 4 and the window panel located thereupon.

Referring to FIG. 4, the present invention window molding 11 is designed such that base 35 has 90° notches 59 located to correspond with the corners of backlite 13. This prevents visually undesirable folds or creases that would otherwise occur. Furthermore, ends 61 of window molding 11 are angled to eliminate the need for a butt joint to hide ends 61 when they mate.

An assembly platform 63 is preferably used to assemble backlite 13 onto window molding 11. This can best be seen in FIGS. 5–8. Platform 63 has steel rails 65 extending peripherally therearound. Rails 65 have cavities 67 EDM-cut therein which matches inside surface 49 of base 35 and outside of flexible finger 33. These rails 65 merely serve to locate and maintain the relative position of window molding 11. First, pressure sensitive adhesive tape 55 is located onto and adhered to the primed outside surface 51 of base 35. A tape liner 69 which covers the exposed side 70 of pressure sensitive adhesive tape 55 is then removed. Next, inside surface 19 of backlite 13 is then placed upon exposed side 70 of pressure sensitive adhesive tape 55. This installation may be performed by manual suction handles 71 or a robot (not shown). Finally, a polyurethane rubber roller 73 is robotically or manually pressed along backlite 13 in order to apply sufficient force against pressure sensitive adhesive tape 55. After application of urethane adhesive bead 57, this assembly is then ready for installation into the final automotive vehicle.

It will be appreciated that the window molding of the present invention represents a significant visual improvement such that the part variation gapping is effectively hidden with minimal visible synthetic rubber surface. Furthermore, the unique adhesive bonding system of the present invention allows for improved quality of the final product since the acrylic pressure sensitive adhesive tape, priming processes, and application techniques resist expansion differentials between the parts caused by relaxation of the adhesives at high temperatures.

While a specific embodiment of the window molding has been disclosed, it will be appreciated that various modifications may be made without departing from the present invention. For example, the window molding may be made from a styrenebutadiene synthetic rubber (SBR) material. Also, while a pressure sensitive adhesive tape has been preferably disclosed, a traditional hot melt or butyl adhesive may also be used to affix a window molding of similar shape to the window panel. Furthermore, such a window molding may be used on a front windshield, side window, or sunroof window, in addition to the disclosed backlite window. While various materials have been disclosed in exemplary fashion, various other materials may of course be employed. It is intended by the following claims to cover these and any other departures from the disclosed embodiment which fall within the true spirit of this invention.

The invention claimed is:

1. A window molding for an automotive vehicle located between a substantially transparent window panel and an adjacent vehicle body panel, said window panel having an outside surface and an inside surface, both of which are peripherally bordered by an edge therearound, said adjacent vehicle body panel having an appearance surface with an offset portion formed therefrom, ending with an inwardly turned flange being substantially parallel to said adjacent vehicle body panel, said window molding being comprised of an elongated flexible member with a typical cross sectional shape having a triangular shaped portion defined by a short visible triangular leg being substantially parallel to and flush with said outside surface of said window panel and said appearance surface of said vehicle body panel, said triangular-shaped portion being further defined by a window-side triangular leg extending generally perpendicularly from one end of a non-appearance side of said visible triangular leg, said triangular-shaped portion also being defined by a body-side triangular leg extending from a second end of said non-appearance side of said visible triangular leg and mating with said window-side triangular leg thereby forming an apex of said triangular-shaped portion, said visible triangular leg, said window-side triangular leg and said body-side triangular leg forming a triangular-shaped hollow therebetween, said window molding having a flexible finger located adjacent to said body-side triangular leg and being joined thereto at said apex of said triangular-shaped portion, said window molding having a base extending inward from said window-side triangular leg at a generally right angle and being joined thereto at said apex of said triangular-shaped portion, said base having an inside surface and an outside surface thereupon, said outside surface of said base being affixed to said inside surface of said window panel and said inside surface of said base being affixed to said flange of said vehicle body panel, whereby said triangular-shaped portion and said flexible finger substantially fill a gap created between said edge of said window panel and said offset portion of said vehicle body panel.

2. The window molding of claim 1 wherein said inside surface of said base has at least one lobe protruding therefrom toward said flange of said vehicle body panel.

3. The window molding of claim 1 wherein said base is affixed to said flange by a urethane adhesive bead.

4. The window molding of claim 1 wherein said base is affixed to said inside surface of said window panel by a pressure sensitive adhesive tape applied therebetween.

\* \* \* \* \*